US012584828B2

(12) United States Patent
Chen et al.

(10) Patent No.: US 12,584,828 B2
(45) Date of Patent: Mar. 24, 2026

(54) INTEGRATED CONSTANT-TEMPERATURE FULLY-AUTOMATIC CELL SMEAR PREPARATION DEVICE AND METHOD FOR AUTOMATIC CYTOLOGY SLIDE PREPARATION

(71) Applicant: JIAXING JINGZHU BIOTECHNOLOGY CO., LTD., Jiaxing (CN)

(72) Inventors: Shilei Chen, Jiaxing (CN); Haigui Zhu, Jiaxing (CN); Yuqing Wang, Jiaxing (CN); Lei Nie, Jiaxing (CN); Fuyu Hu, Jiaxing (CN); Kuoye Wang, Jiaxing (CN); Yiming Li, Jiaxing (CN); Bin Zeng, Jiaxing (CN); Longfei Lu, Jiaxing (CN)

(73) Assignee: JIAXING JINGZHU BIOTECHNOLOGY CO., LTD., Jiaxing (CN)

( * ) Notice: Subject to any disclaimer, the term of this patent is extended or adjusted under 35 U.S.C. 154(b) by 620 days.

(21) Appl. No.: 18/029,678

(22) PCT Filed: Apr. 20, 2021

(86) PCT No.: PCT/CN2021/088274
§ 371 (c)(1),
(2) Date: Mar. 31, 2023

(87) PCT Pub. No.: WO2022/073332
PCT Pub. Date: Apr. 14, 2022

(65) Prior Publication Data
US 2023/0358647 A1 Nov. 9, 2023

(30) Foreign Application Priority Data
Oct. 9, 2020 (CN) .......................... 202011074174.4

(51) Int. Cl.
*G01N 1/00* (2006.01)
*G01N 1/28* (2006.01)
*G01N 1/31* (2006.01)

(52) U.S. Cl.
CPC .......... *G01N 1/2813* (2013.01); *G01N 1/312* (2013.01)

(58) Field of Classification Search
CPC ................. G01N 1/2813; G01N 1/312; G01N 35/00029; G01N 35/04; G01N 35/1002;
(Continued)

(56) References Cited

U.S. PATENT DOCUMENTS 3,853,092 A 12/1974 Amos et al.
5,595,707 A 1/1997 Copeland et al.
(Continued)

FOREIGN PATENT DOCUMENTS

CN 1466685 A 1/2004
CN 201025481 Y 2/2008
(Continued)

*Primary Examiner* — Elizabeth A Robinson
*Assistant Examiner* — Tingchen Shi
(74) *Attorney, Agent, or Firm* — Bayramoglu Lew Offices LLC

(57) ABSTRACT
An integrated constant-temperature fully-automatic cell smear preparation device includes a rotary settling disc, where the rotary settling disc includes a settling disc base and a turntable body connected to a settling disc body through a fixed shaft; a glass slide addition mechanism arranged adjacent to a glass slide inlet position of the rotary settling disc; a cleaning and sample addition integrated device, where the cleaning and sample addition integrated device is arranged on a side of the rotary settling disc, the cleaning and sample addition integrated device includes a cleaning assembly and a sample addition assembly, and the cleaning assembly and the sample addition assembly add fluid to one or more different settling cups simultaneously as
(Continued)

the turntable body rotates intermittently; and a glass slide discharging mechanism arranged adjacent to a glass slide outlet position of the rotary settling disc.

18 Claims, 6 Drawing Sheets

(58) Field of Classification Search
CPC .......... G01N 2035/00049; G01N 2035/00089;
G01N 2035/00138; G01N 2035/0405;
G01N 2035/0437; G01N 2035/0441;
G01N 1/31
See application file for complete search history.

(56) References Cited

U.S. PATENT DOCUMENTS

| | | | |
|---|---|---|---|
| 9,170,179 B2 | 10/2015 | Angros | |
| 10,228,382 B2 | 3/2019 | Dockrill et al. | |

| 2003/0017613 A1 | 1/2003 | Jakubowicz et al. |
|---|---|---|
| 2010/0167943 A1 | 7/2010 | Adey et al. |
| 2015/0362352 A1 | 12/2015 | Garrepy et al. |
| 2020/0278277 A1 | 9/2020 | Le Comte et al. |

FOREIGN PATENT DOCUMENTS

| CN | 201225970 Y | 4/2009 |
|---|---|---|
| CN | 103760375 A | 4/2014 |
| CN | 102768142 B | 9/2014 |
| CN | 106018033 A | 10/2016 |
| CN | 106771288 B | 6/2018 |
| CN | 207923560 U | 9/2018 |
| CN | 208805501 U | 4/2019 |
| CN | 106769291 B | 8/2019 |
| CN | 106323712 B | 9/2019 |
| CN | 209589628 U | 11/2019 |
| CN | 112113817 A | 12/2020 |
| CN | 112113818 A | 12/2020 |
| CN | 213842795 U | 7/2021 |

24    33    34    32

INTEGRATED CONSTANT-TEMPERATURE FULLY-AUTOMATIC CELL SMEAR PREPARATION DEVICE AND METHOD FOR AUTOMATIC CYTOLOGY SLIDE PREPARATION

CROSS REFERENCE TO THE RELATED APPLICATIONS

This application is the national phase entry of International Application No. PCT/CN2021/088274, filed on Apr. 20, 2021, which is based upon and claims priority to Chinese Patent Application No. 202011074174.4, filed on Oct. 9, 2020, the entire contents of which are incorporated herein by reference.

TECHNICAL FIELD

The present invention relates to the technical field of instruments for pathological cells, diagnostics and pathological biomolecule diagnostics, specifically to a cell smear preparation device, in particular to an integrated constant-temperature fully-automatic cell smear preparation device and a method for automatic cytology slide preparation.

BACKGROUND

In the medical testing and biological research, it is often necessary to perform smear preparation and staining on cell samples for convenient observation. The traditional smear preparation and staining process is carried out by hand, but the accuracy of the diagnosis is affected by a large number of cell accumulation and interference factors such as red blood cells, mucus, impurities and the like in the handmade cell smear, resulting in a false negative rate of 2% to 50%. In addition, the operator is likely to suffer eyestrain because the traditional preparation and staining process is time-consuming, laborious, and low-efficiency. In recent years, the application of liquid-based cytology technology has made a new breakthrough in the cell smear preparation and staining technology. In the liquid-based cytology technology, exfoliated cells are stored in a cell storage solution, which can effectively exclude interference factors such as red blood cells, mucus, impurities, and so on. Further, the liquid-based cytology technology can disperse and dissociate cell clusters to significantly improve the smear quality of pathological cytology, so that the cell structure and background are clear to facilitate diagnosis and significantly reduce the false negative rate.

By searching literature and patents, in the patents and literature related to cell smear preparation, the Chinese patent with the publication number of CN106018033A and the publication date of Oct. 12, 2016, entitled "fully-automatic liquid-based thin-layer cell smear preparation and staining device" discloses a fully-automatic liquid-based thin-layer cell smear preparation and staining device. In the technical solution disclosed by this patent, the device can automatically realize the operation of sample placement, pipetting, smear preparation and staining. Although the device can prepare the smear automatically to some extent and replace a part of manual operations, the smear preparation and staining device will lead to different extents of staining under different temperatures without effective quality control. Moreover, the device can only realize sample placement and staining rather than the full automation of cleaning, glass slide receiving and other processes, so it still needs manual operations, thus increasing the labor cost and smear preparation time, which is not conducive to reducing the cost of the whole process.

SUMMARY

In view of the defects in the prior art, an objective of the present invention is to provide an integrated constant-temperature fully-automatic cell smear preparation device and a method for automatic cytology slide preparation.

In view of this, the present invention provides an integrated constant-temperature fully-automatic cell smear preparation device, including:

a rotary settling disc, where the rotary settling disc includes a settling disc base and a turntable body connected to a settling disc body through a fixed shaft, a temperature control assembly is arranged at the bottom of the settling disc base, and a glass slide inlet, a glass slide outlet, and a cleaning and sample addition inlet are sequentially formed in a side wall of the settling disc base; at least one or more settling cup receiving grooves are uniformly arranged along a circumferential edge of the turntable body to receive a settling cup; the turntable body rotates intermittently around the fixed shaft, at least four glass slide clamping slots are formed between the turntable body and the rotary settling disc base, and glass slides without samples or glass slides with the samples are adaptively placed in the glass slide clamping slots;

a glass slide addition mechanism, where the glass slide addition mechanism is arranged adjacent to a glass slide inlet position of the rotary settling disc, and the glass slide addition mechanism is configured to push the glass slides without the samples into the rotary settling disc from the glass slide inlet position;

a cleaning and sample addition integrated device, where the cleaning and sample addition integrated device is arranged on a side of the rotary settling disc, the cleaning and sample addition integrated device includes a cleaning fluid assembly and a sample addition assembly, and the cleaning fluid assembly and the sample addition assembly add fluid to one or more different settling cups simultaneously as the turntable body rotates intermittently; and a glass slide discharging mechanism, where the glass slide discharging mechanism is arranged adjacent to a glass slide outlet position of the rotary settling disc, and the glass slide discharging mechanism is configured to remove the glass slides with the samples from the glass slide outlet position.

Preferably, the outer wall and the bottom of the settling disc base are provided with a thermal insulation layer. The inner layer of the thermal insulation layer adjacent to the turntable body is provided with thermal insulation cotton, and the outer layer of the thermal insulation layer far away from the turntable body is provided with a metal cladding.

Preferably, the temperature control assembly includes a temperature control element and a heating device connected to the temperature control element. The heating device is arranged at the position of the settling disc base corresponding to the settling cup receiving grooves, and the temperature control element includes a resistance regulator.

Preferably, the temperature control assembly controls the temperature of the settling cups in the settling cup receiving grooves to be 20-60° C.

Preferably, the glass slide addition mechanism includes a glass slide case with an opening and a pushing device. The pushing device pushes glass slides stored in the glass slide case to move to the glass slide inlet position via the opening, and then enter the glass slide clamping slots of the rotary settling disc through the glass slide inlet.

Preferably, the cleaning and sample addition integrated device further includes a manipulator. One end of the manipulator is connected to a Z-direction adjustment mechanism, and the cleaning fluid assembly at the other end of the manipulator is connected to a fluid of the sample addition assembly.

The Z-direction adjustment mechanism reciprocates in the vertical direction to adjust a relative height of the manipulator relative to the turntable body.

Preferably, the manipulator has an arc portion.

Preferably, the glass slide discharging mechanism includes a glass slide discharging fork and a drive mechanism connected to the glass slide discharging fork.

Preferably, the settling cup receiving grooves and the glass slide clamping slots are arranged at intervals, and when the turntable body rotates intermittently, the glass slide inlet, the glass slide outlet and a glass slide clamping slot at a cleaning and sample addition inlet position are communicated with a space of the settling cup receiving grooves.

Correspondingly, the present invention further provides a method for using the aforementioned integrated constant-temperature fully-automatic cell smear preparation device, including the following steps:

step S1: allowing the glass slides without the samples to enter the rotary settling disc from the glass slide inlet and rotate intermittently with the turntable body; and step S2: allowing the cleaning fluid assembly and the sample addition assembly in the cleaning and sample addition integrated device to simultaneously add fluid to one or more different settling cups as the turntable body rotates intermittently, at this time, adding, by the sample addition assembly, the samples to the glass slides without the samples through the settling cups, cleaning, by the cleaning assembly, a settling cup that already completes sample addition, and removing the glass slides with the samples from the glass slide outlet.

Compared with the prior art, the integrated constant-temperature fully-automatic cell smear preparation device and the method for automatic cytology slide preparation according to the present invention have the following advantages:

(1) The extent of staining is different at different temperatures, which leads to the difference in smear preparation quality. The temperature control system can provide a stable external environment for the staining reaction in different seasons and regions to obtain a stable smear preparation quality.

(2) The creative settling cup is reusable through being cooperated with a cleaning mechanism and cleaning reagent, thereby improving the efficiency without repeated loading of the settling cup, which realizes automation, saves consumables and reduces the cost.

(3) The integrated reagent pipette works in cooperation with the integrated cleaning pipette, so that the settling cup can be cleaned, meanwhile performing the Papanicolaou staining. The present invention optimizes the mechanical structure, reduces the sample waiting time, and greatly improves the smear preparation efficiency.

(4) The large-capacity glass slide case and an automatic pushing structure can reduce manual operations, minimize the waste of consumables, and improve the automation level of the whole smear preparation process.

BRIEF DESCRIPTION OF THE DRAWINGS

By reading the detailed description of the non-restrictive embodiments with reference to the following drawings, other features, objectives, and advantages of the present invention will become more apparent.

Figure 1:
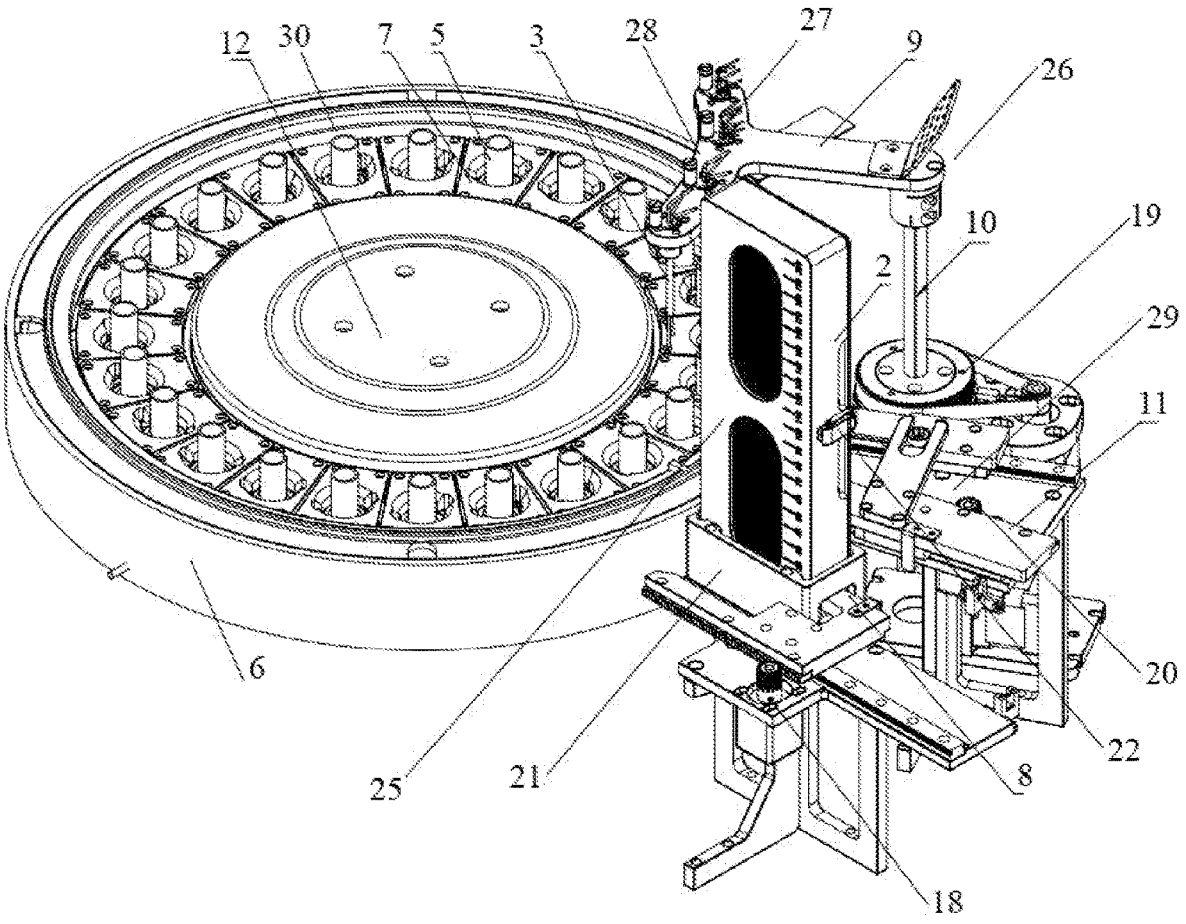

FIG. 1 is an integrated constant-temperature fully-automatic cell smear preparation device according to the present invention.

Figure 2:
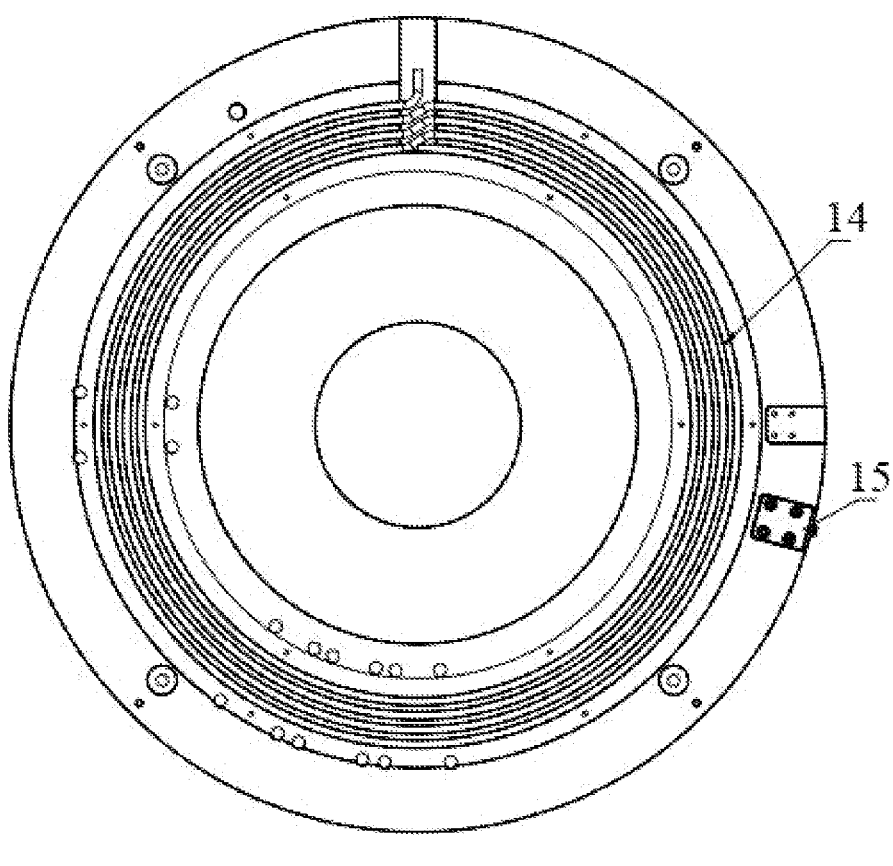

FIG. 2 is a schematic diagram of the rotary settling disc of the integrated constant-temperature fully-automatic cell smear preparation device shown in FIG. 1.

Figure 3:
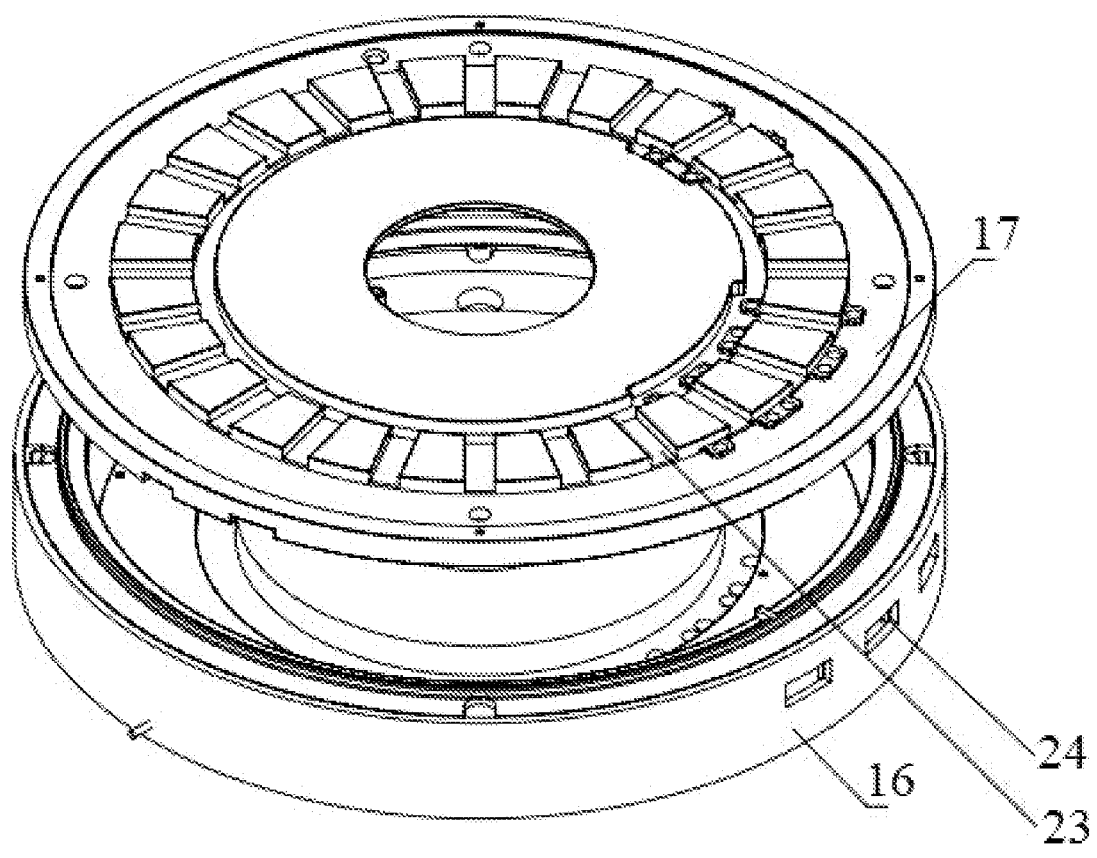

FIG. 3 is a perspective view showing the structure of the rotary settling disc in some embodiments of the integrated constant-temperature fully-automatic cell smear preparation device according to the present invention.

Figure 4:
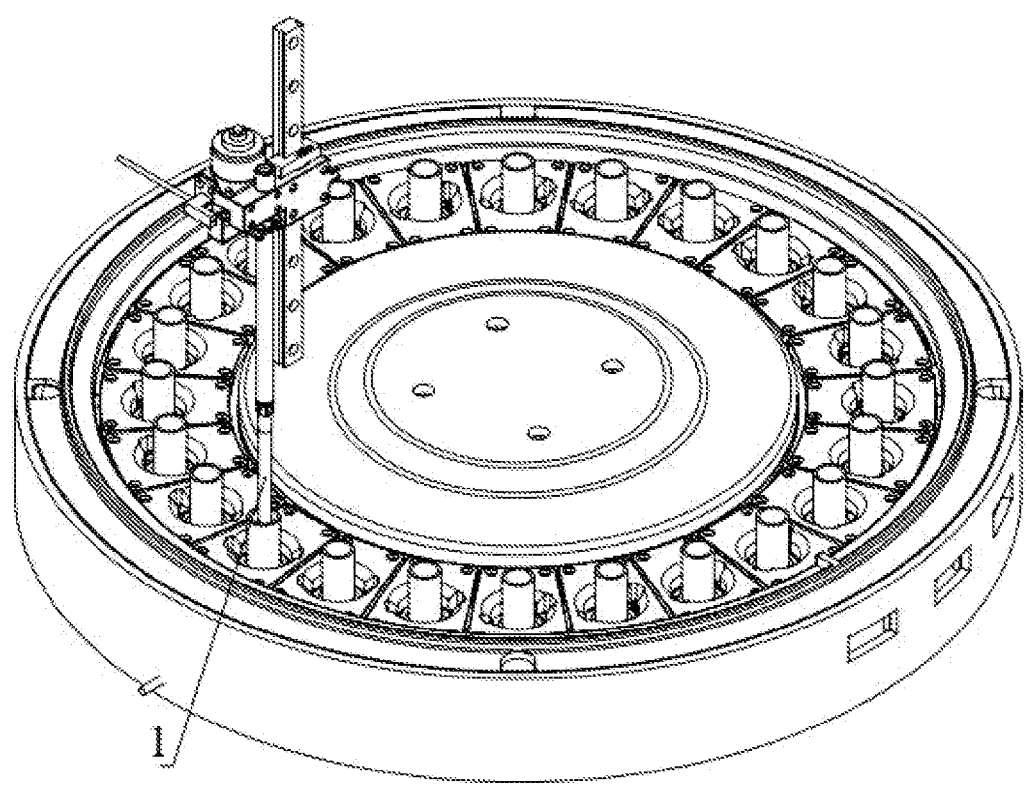

FIG. 4 is a schematic diagram showing performing a sample addition operation on the rotary settling disc in the integrated constant-temperature fully-automatic cell smear preparation device according to the present invention.

Figure 5:
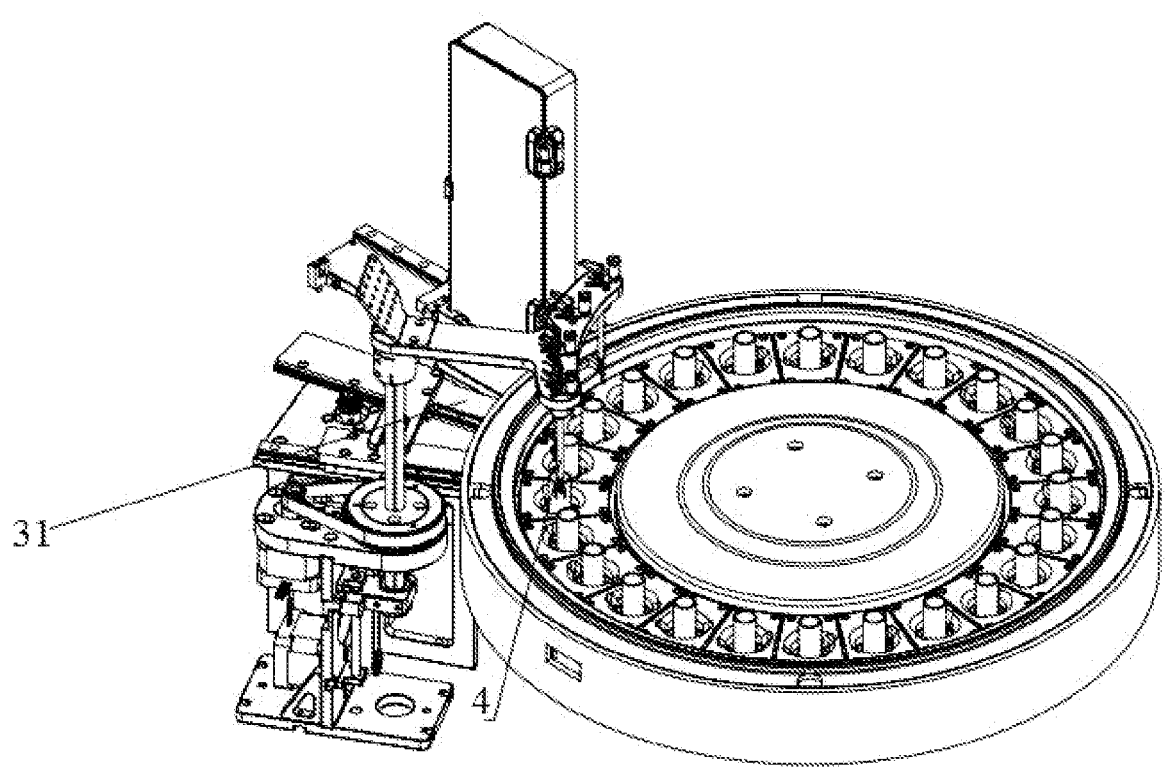

FIG. 5 is a schematic diagram showing performing a cleaning operation on the rotary settling disc in the integrated constant-temperature fully-automatic cell smear preparation device according to the present invention.

Figure 6:
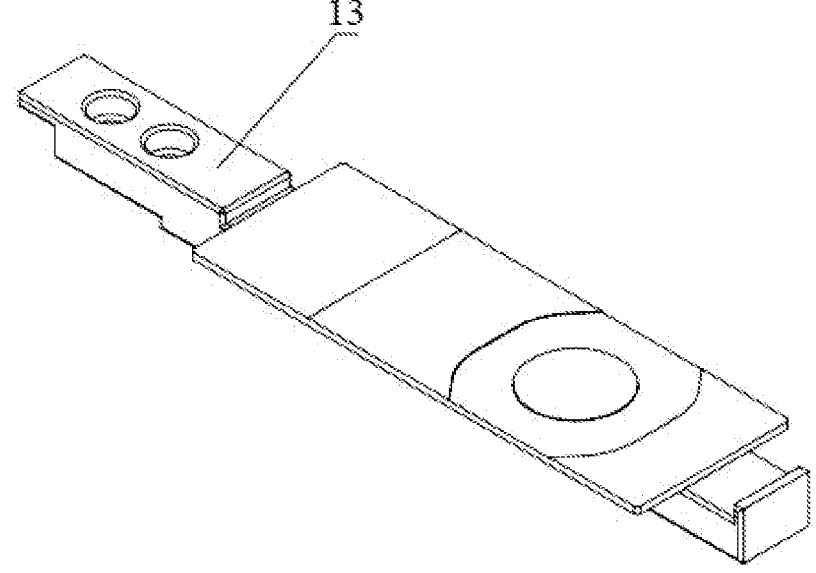

FIG. 6 is a schematic diagram of a fork structure in the integrated constant-temperature fully-automatic cell smear preparation device according to the present invention.

Figure 7:
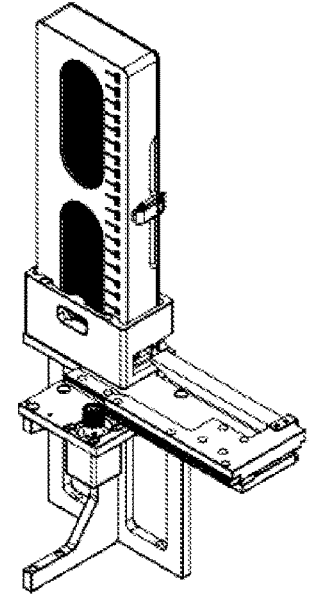

FIG. 7 is a schematic diagram of a pushing mechanism in the integrated constant-temperature fully-automatic cell smear preparation device according to the present invention.

Figure 8:
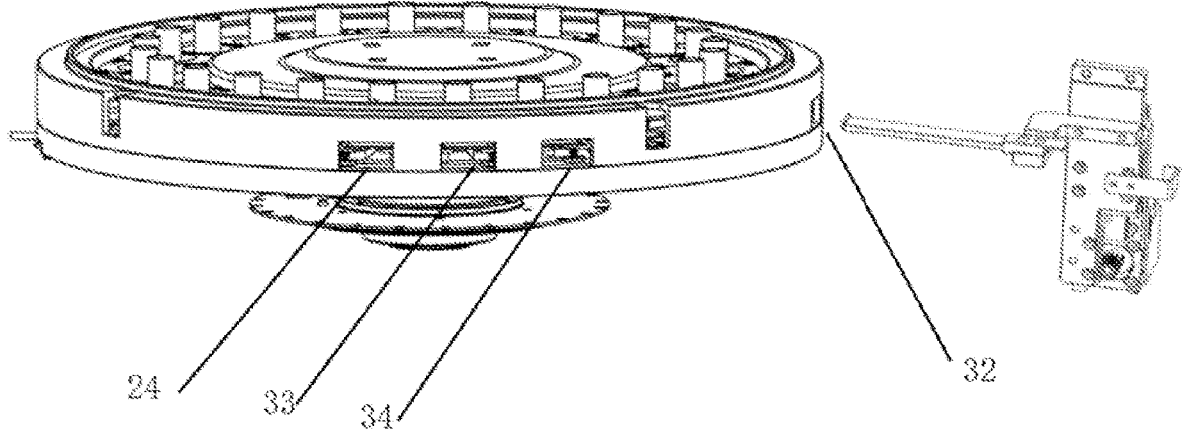

FIG. 8 is a schematic diagram showing performing a forking operation by the pushing mechanism in the integrated constant-temperature fully-automatic cell smear preparation device to discharge a glass slide according to the present invention.

Reference numbers in the figures are as follows:

1-sample addition pipette
2-glass slide case
3-integrated cleaning pipette
4-integrated reagent pipette
5-settling cup
6-thermal insulation housing
7-lifting mechanism
8-glass slide feeding fork
9-transverse reagent arm R shaft
10-reagent arm Z shaft
11-cleaning board pushing mechanism
12-rotary settling disc
13-glass slide discharging fork
14-heating band
15-temperature control assembly
16-thermal insulation housing
17-constant-temperature turntable
18-fork motor
19-lifting drive motor
20-cleaning board motor
21-glass slide case clamping slot
22-glass slide case clasp
23-glass slide clamping slot
24-glass slide inlet
25-glass slide storage and pushing mechanism
26-pipetting mechanism
27-reagent pipette assembly
28-arc bracket
29-cleaning assembly
30-settling smear preparation assembly
31-cleaning board
32-glass slide outlet
33-first cleaning board inlet
34-second cleaning board inlet

DETAILED DESCRIPTION OF THE EMBODIMENTS

The present invention is described in detail below in conjunction with embodiments. The following embodiments are helpful for those skilled in the art to further understand the present invention but do not limit the present invention in any form. It should be pointed out that for those having ordinary skill in the art, some changes and improvements may be made without departing from the idea of the present invention, and these changes and improvements shall fall within the scope of protection of the present invention.

Embodiment 1

FIG. 1 is an integrated constant-temperature fully-automatic cell smear preparation device according to the present invention.

As shown in FIG. 1 and in combination with FIGS. 2-8 if necessary, an integrated constant-temperature fully-automatic cell smear preparation device includes the rotary settling disc 12, the glass slide storage and pushing mechanism 25, the sample addition pipette 1, the pipetting mechanism 26, and the cleaning assembly 29. Specifically, the settling disc 12 includes the constant-temperature turntable 17 provided with a plurality of glass slide clamping slots 23 spaced in the outer circumferential direction, the thermal insulation housing 16, and the settling smear preparation assembly 30. Specifically, the glass slide storage and pushing mechanism 25 includes the glass slide case 2, the glass slide feeding fork 8 and the glass slide discharging fork 13. The pipetting mechanism 26 includes the reagent arm Z shaft 10, the transverse reagent arm R shaft 9, and the reagent pipette assembly 27 located at an end of the transverse reagent arm R shaft 9. The reagent pipette assembly 27 forms an arc and is located directly above the settling cup 5.

Further, a temperature control system is integrated inside the constant-temperature turntable 17, and the thermal insulation housing 16 wraps the outer periphery and the lower part of the settling disc 12. The settling smear preparation assembly 30 includes the glass slide clamping slot 23, the lifting mechanism 7, and the settling cup 5. The lifting mechanism 7 controls the settling cup 5 to move up and down along the central axial direction of the constant-temperature turntable 17.

The lifting mechanism 7 controls the settling cup 5 to rise, the fork motor 18 drives the glass slide feeding fork 8 to push the glass slide in the glass slide case 2 into the glass slide clamping slot 23 through the glass slide inlet 24, and then the lifting mechanism 7 controls the settling cup 5 to lower down, so that the bottom of the settling cup 5 is hermetically attached to the glass slide.

The reagent pipette assembly 27 includes the arc bracket 28 vertically arranged, the integrated reagent pipette 4, the integrated cleaning pipette 3. Each of the integrated reagent pipette 4 and the integrated cleaning pipette 3 is connected to an external container through an internal suction tube. The lifting drive motor 19 drives the reagent arm Z shaft 10 to move up and down to add a reagent and extract a waste solution. The cleaning assembly 29 includes a cleaning board and the cleaning board pushing mechanism 11.

Each time the constant-temperature turntable 17 finishes Papanicolaou staining or settling cup cleaning, the constant-temperature turntable 17 rotates at least once to transfer the next idle settling cup 5 to be below the reagent pipette assembly 27.

The integrated reagent pipette 4 works in cooperation with the integrated cleaning pipette 3, so that the sample in one settling cup is subject to Papanicolaou staining while another settling cup in a cleanable state is cleaned simultaneously.

More specifically, the temperature control system includes the heating band 14 and the temperature control assembly 15. The temperature is controllably adjusted in the range of 20° C.-45° C., thereby providing a stable external environment for the staining reaction through the thermal insulation housing 16 on the periphery.

Further, specifically, the glass slide case 2 carrying the glass slide is buckled by the glass slide case clasp 22 and inserted into the glass slide case clamping slot 21 to be fixed. The lifting mechanism 7 controls the settling cup 5 to rise, and the glass slide feeding fork 8 pushes out the glass slide and enters the corresponding glass slide clamping slot 23 from the glass slide inlet 24 through the rotation of the rotary settling disc 12. The lifting mechanism 7 lowers the settling cup 5, so that the bottom of the settling cup 5 is hermetically attached to the glass slide. The sample is injected into the settling cup 5 by the sample addition pipette 1, the settling cup is rotated by the constant-temperature turntable to be below the integrated reagent pipette, and the lifting drive motor 19 drives the reagent arm Z shaft 10 to lower down to carry out the process of Papanicolaou staining. After the completion of Papanicolaou staining, the glass slide clamping slot is rotated to a discharging position, the glass slide discharging fork 13 lowers down and enters the constant-temperature turntable through the glass slide outlet 32, then the glass slide discharging fork 13 rises to be below the glass slide, and the glass slide discharging fork 13 exits to pull out the glass slide. The glass slide clamping slot is rotated to a cleaning position, the lifting mechanism controls the settling cup to rise, and the cleaning board motor 20 drives the cleaning board pushing mechanism 11 to push the cleaning board from the cleaning board inlet 33 into the glass slide clamping slot 23. The lifting mechanism controls the settling cup 5 to lower down, and the bottom of the settling cup 5 is hermetically attached to the cleaning board 31 to form a hermetical structure. The integrated cleaning pipette 3 injects the cleaning reagent into the settling cup 5. After the cleaning is completed, the integrated cleaning pipette 3 extracts out the waste solution. The lifting mechanism controls the settling cup to rise, the cleaning board motor 20 drives the cleaning board pushing mechanism to pull out the cleaning board, and the lifting mechanism controls the settling cup to lower down.

The reagent and the stain solution are transferred through the integrated reagent pipette, and the settling cup cleaning fluid is transferred through the integrated cleaning pipette. The glass slide contains a cationic high-adsorption glass slide.

The integrated constant-temperature fully-automatic cell smear preparation device includes the rotary settling disc 12, the glass slide storage and pushing mechanism 25, the sample addition pipette 1, the pipetting mechanism 26, and the cleaning assembly 29. Specifically, the settling disc 12 includes the constant-temperature turntable 17 provided with a plurality of glass slide clamping slots 23 spaced in the outer circumferential direction, the thermal insulation housing 16, and the settling smear preparation assembly 30. Specifically, the glass slide storage and pushing mechanism 25 includes the glass slide case 2, the glass slide feeding fork 8 and the glass slide discharging fork 13. The pipetting mechanism 26 includes the reagent arm Z shaft 10, the transverse reagent arm R shaft 9, and the reagent pipette assembly 27 located at an end of the transverse reagent arm R shaft 9. The reagent pipette assembly 27 forms an arc and is located directly above the settling cup 5.

Further, a temperature control system is integrated inside the constant-temperature turntable 17, and the thermal insulation housing 16 wraps the outer periphery and the lower part of the settling disc 12. The settling smear preparation assembly 30 includes the glass slide clamping slot 23, the lifting mechanism 7, and the settling cup 5. The lifting mechanism 7 controls the settling cup 5 to move up and down along the central axial direction of the constant-temperature turntable 17.

The lifting mechanism 7 controls the settling cup 5 to rise, the fork motor 18 drives the glass slide feeding fork 8 to push the glass slide in the glass slide case 2 into the glass slide clamping slot 23 through the glass slide inlet 24, and then the lifting mechanism 7 controls the settling cup 5 to lower down, so that the bottom of the settling cup 5 is hermetically attached to the glass slide.

The reagent pipette assembly 27 includes the arc bracket 28 vertically arranged, the integrated reagent pipette 4, the integrated cleaning pipette 3. Each of the integrated reagent pipette 4 and the integrated cleaning pipette 3 is connected to an external container through an internal suction tube. The lifting drive motor 19 drives the reagent arm Z shaft 10 to move up and down to add a reagent and extract a waste solution. The cleaning assembly 29 includes a cleaning board and the cleaning board pushing mechanism 11.

Each time the constant-temperature turntable 17 finishes Papanicolaou staining or settling cup cleaning, the constant-temperature turntable 17 rotates at least once to transfer the next idle settling cup 5 to be below the reagent pipette assembly 27.

The integrated reagent pipette 4 works in cooperation with the integrated cleaning pipette 3, so that the sample in one settling cup is subject to Papanicolaou staining while another settling cup in a cleanable state is cleaned simultaneously.

More specifically, the temperature control system includes the heating band 14 and the temperature control assembly 15. The temperature is controllably adjusted in the range of 20° C.-45° C., thereby providing a stable external environment for the staining reaction through the thermal insulation housing 16 on the periphery.

Further, specifically, the glass slide case 2 carrying the glass slide is buckled by the glass slide case clasp 22 and inserted into the glass slide case clamping slot 21 to be fixed. The lifting mechanism 7 controls the settling cup 5 to rise, and the glass slide feeding fork 8 pushes out the glass slide and enters the corresponding glass slide clamping slot 23 from the glass slide inlet 24 through the rotation of the rotary settling disc 12. The lifting mechanism 7 lowers the settling cup 5, so that the bottom of the settling cup 5 is hermetically attached to the glass slide. The sample is injected into the settling cup 5 by the sample addition pipette 1, the settling cup is rotated by the constant-temperature turntable to be below the integrated reagent pipette, and the lifting drive motor 19 drives the reagent arm Z shaft 10 to lower down to carry out the process of Papanicolaou staining. After the completion of Papanicolaou staining, the glass slide clamping slot is rotated to a discharging position, the glass slide discharging fork 13 lowers down and enters the constant-temperature turntable through the glass slide outlet 32, then the glass slide discharging fork 13 rises to be below the glass slide, and the glass slide discharging fork 13 exits to pull out the glass slide. The glass slide clamping slot is rotated to a cleaning position, the lifting mechanism controls the settling cup to rise, and the cleaning board motor 20 drives the cleaning board pushing mechanism 11 to push the cleaning board from the cleaning board inlet 33 into the glass slide clamping slot 23. The lifting mechanism controls the settling cup 5 to lower down, and the bottom of the settling cup 5 is hermetically attached to the cleaning board 31 to form a hermetical structure. The integrated cleaning pipette 3 injects the cleaning reagent into the settling cup 5. After the cleaning is completed, the integrated cleaning pipette 3 extracts out the waste solution. The lifting mechanism controls the settling cup to rise, the cleaning board motor 20 drives the cleaning board pushing mechanism to pull out the cleaning board, and the lifting mechanism controls the settling cup to lower down.

In the above process, the operation flow of the constant-temperature fully-automatic cell smear preparation device of the present invention is as follows:

automatically loading the glass slide and hermetically attaching the glass slide to the settling cup;

adding the treated sample to the settling cup and settling at a constant temperature;

performing Papanicolaou staining on cells after settlement;

transferring the glass slide after the Papanicolaou staining out of the glass slide clamping slot, and cleaning the settling cup; wherein the treated sample is added to the settling cup by a sample addition pipette, and the temperature for constant-temperature static settlement is controlled at 20° C.-60° C.

The Papanicolaou staining is implemented by the following operation steps: the sample is statically settled for 3-15 min, and after the supernatant is removed, 0.5-2 ml of anhydrous ethanol or isopropanol is added and then removed after 8-12 s; subsequently, 0.5-2 ml of PH7.7 tris buffer is added and then removed after 3-8 s; 0.5-2 ml of hematoxylin staining solution is added and then removed after 1-5 min; 0.5-2 ml of PH7.7 tris buffer is added and then removed after 0.5-1 min; 0.5-2 ml of anhydrous ethanol or isopropanol is added and then removed after 3-8 s; 0.5-2 ml of anhydrous ethanol or isopropanol is added and then removed after 3-8 s; 0.5-2 ml of EA-OG mixed staining solution is added and then removed after 1-5 min; 0.5-2 ml of anhydrous ethanol or isopropanol is added and then removed after 5-10 s; 0.5-2 ml of anhydrous ethanol or isopropanol is added and then removed after 5-10 s; the glass slide is transferred out of the glass slide clamping slot by the glass slide discharging fork, and then the cleaning board is moved to the glass slide clamping slot to clean the settling cup.

Embodiment 2

In the present embodiment, the integrated constant-temperature fully-automatic cell smear preparation device further includes a sealing device. The sealing device is configured to seal the glass slide after the glass slide is transferred out of the glass slide clamping slot. The sealing device includes a frame, a fork, an adhesive addition arm, a sealing adhesive reagent pipette, a curing cup, a curing box, an ultraviolet lamp, the first control motor 7 and a second control motor.

Specifically, the sample sliding rail is arranged on the frame. The fork is arranged at one end of the sample sliding rail and is configured to slide in the sample sliding rail. The curing box and the ultraviolet lamp are successively arranged above the sample sliding rail from the side where the fork is arranged to the other side. The curing cup is arranged on the curing box. The adhesive addition arm is arranged above the curing cup, and the sealing adhesive reagent pipette is arranged on the adhesive addition arm. The first control motor and the second control motor are arranged on the frame. The first control motor is connected to the adhesive addition arm and is configured to drive the adhesive addition arm to move in the vertical direction. The second control motor is connected to the adhesive addition arm and is configured to drive the adhesive addition arm to move in the horizontal direction. The glass slide is placed in the sample sliding rail and is configured to slide in the sample sliding rail under the action of the fork.

Moreover, the first control motor is connected to the adhesive addition arm through a gear or belt transmission mechanism and is configured to drive the adhesive addition arm to rotate in the horizontal direction. The second control motor is connected to the adhesive addition arm through a gear-rack mechanism or a gear-worm mechanism and is configured to drive the adhesive addition arm to move up and down.

A receiving groove is arranged at the bottom of the curing box, the receiving groove is configured to receive a glass slide. A through hole is formed in the middle of the curing box, and the through hole is the holding position of the curing cup. The through hole is communicated with the receiving groove. The bottom of the curing box is provided with a guide spring column. The bottom of the curing cup is hollowed out. A limit clamping slot is arranged in the circumferential direction of the holding position of the curing cup on the curing box. A protruding clamping block is arranged on the circumferential direction of the curing cup, and the clamping block is configured to be matched with the limit clamping slot to form connection.

Moreover, the width of the receiving groove at the bottom of the curing box is matched with the size of the sample glass slide. When the curing cup is tightly pressed by the adhesive addition arm, the receiving groove at the bottom of the curing box clamps the sample glass slide tightly to prevent the sample glass slide from moving. The size of the through hole is matched with the size of the curing cup. The clamping block arranged in the circumferential direction of the curing cup is matched with and connected to the limit clamping slot on the curing box so that the curing cup is limited and stably installed on the curing box and is prevented from moving or rotation, without affecting the subsequent adhesive dripping process, and the adhesive dripping position maintains fixed. The guide spring column at the bottom of the curing box is in a state of energy storage when the curing cup is tightly pressed on the surface of the sample glass slide by the adhesive addition arm. When the adhesive addition arm is lifted, the stored energy released by the guide spring column can automatically lift the curing cup to separate the curing cup from the sample glass slide. The hollowed area at the bottom of the curing cup is circular, so that the sealing adhesive forms a circular curing layer at a fixed position on the sample glass slide.

Preferably, in some embodiments, a lampshade may be arranged on the outside of the ultraviolet lamp. The lampshade is located above the sample sliding rail, and the sample glass slide added with adhesive is cured by the ultraviolet lamp in the lampshade.

A sealing adhesive receiving device, an injection system, a suction system, and a waste adhesive receiving device are arranged in the adhesive addition arm. The reagent pipette includes an adhesive addition pipette and an adhesive suction pipette. The sealing adhesive receiving device is connected to the injection system, and the injection system is connected to the adhesive addition pipette. The adhesive suction pipette is connected to the suction system, and the suction system is connected to the waste adhesive receiving device. One or a plurality of adhesive suction pipettes are arranged, and the plurality of adhesive suction pipettes are uniformly arranged in the circumferential direction of the adhesive addition pipette. A measurement device is arranged on the injection system.

The injection system is configured to dropwise add the sealing adhesive in the sealing adhesive receiving device to the surface of the sample glass slide by the adhesive addition pipette. The volume of the adhesive injected by the injection system is measured by the measurement device, and the volume of the adhesive dripped is controlled by the measurement device. The suction system is configured to suck the excess sealing adhesive to the waste adhesive receiving device through the adhesive suction pipette. In an embodiment, four adhesive suction pipettes are uniformly arranged in the circumferential direction of the adhesive addition pipette, namely, the first adhesive suction pipette, the second adhesive suction pipette, the third adhesive suction pipette, and the fourth adhesive suction pipette.

Embodiment 3

In the present embodiment, the integrated constant-temperature fully-automatic cell smear preparation device further includes a porous plate filter device, and the porous plate filter device is configured to perform positive pressure blowing on the glass slide.

The porous plate filter device includes a porous plate, a clamping claw, a movement assembly, a guide block, a blowing positive pressure block, and a frame. The movement assembly, the guide block, and the blowing positive pressure block are arranged on the frame. The clamping claw is connected to the movement assembly and is configured to move under the action of the movement assembly, and the clamping claw is configured to grab the porous plate. The porous plate is installed on the guide block, and the guide block is located below the blowing positive pressure block. The movement assembly includes an X-axis sliding rail and a Y-axis sliding rail. The Y-axis sliding rail is installed on the X-axis sliding rail and is configured to move on the X-axis sliding rail. The clamping claw is installed on the Y-axis sliding rail and is configured to move on the Y-axis sliding rail. The porous plate filter device further includes a stack assembly. The stack assembly includes multiple layers of placement positions, and the placement positions are configured to place the porous plate.

The guide block is movably connected to the frame, and the guide block is configured to be translated and rotated below the blowing positive pressure block. The blowing positive pressure block is movably connected to the frame, and the blowing positive pressure block is configured to be translated and/or rotated above the guide block. The blowing positive pressure block is configured to be connected to external gas through a pipeline.

The porous plate includes a hole grid, a filter membrane, and a filter disk. The filter membrane is connected at the bottom of the hole grid, and the filter disk is detachably connected below the filter membrane. Two side edges of the porous plate are rolled outward to form a clamping position. One or more clamping strips are arranged at the bottom of the edge of the porous plate, and one or more clamping slots are arranged on the clamping claw. When the clamping claw is clamped at the clamping position of the porous plate, the clamping strips are matched with the clamping slots in one-to-one correspondence. A cutting corner is formed on a side edge of the porous plate to form a placement sign. A plurality of hole grids is provided, and the plurality of hole grids are arranged in multiple rows and multiple rows. The hole grid is arch-shaped, T-shaped or triangular. The diameter of the filter hole of the filter membrane is 1-50 μm.

Preferably, in some embodiments, the porous plate includes 24 arch-shaped hole grids arranged in 6 rows and 4 rows. The filter membrane adopts a strainer, and the strainer is welded at the bottom of the hole grids by hot welding process. The diameter of the arc part of the arch-shaped hole grid is (i) 4-50 mm. The width of the straight edge of the arch-shaped hole grid is 4-50 mm, and the depth of the arch-shaped hole grid is 5-40 mm. The liquid addition volume of the porous plate is 20-3000 μL, and the porous plate is made of polyethersulfone (PES), polyethylene (PE) or polyethylene terephthalate (PET).

It should be noted that the prior art part in the scope of protection of the present invention is not limited to the embodiments given in this application document, and all prior arts that do not contradict the solution of the present invention, including, but not limited to, prior patent documents, prior public publications, prior public use, etc., can be included in the scope of protection of the present invention.

In addition, the combination of the technical features in this application is not limited to the combination recorded in the claims or the combination recorded in the specific embodiments. All the technical features recorded in this application can be freely combined in any way unless there is a contradiction between each other.

It should also be noted that the embodiments listed above are only specific embodiments of the present invention. It is obvious that the present invention is not limited to the above embodiments, and the subsequent similar changes or deformations that can be directly derived or easily associated by those skilled in the art from the contents disclosed by the present invention shall fall within the scope of protection of the present invention.

Specific embodiments of the present invention are described above. It should be understood that the present invention is not limited to the above-mentioned specific embodiments and that those skilled in the art may make various changes or modifications within the scope of the claims, which does not affect the substance of the present invention. In case of no conflict, the embodiments as well as the features of embodiments of this application may be arbitrarily combined with each other.

What is claimed is:

1. An integrated constant-temperature fully-automatic cell smear preparation device, comprising:
   a rotary settling disc, wherein the rotary settling disc comprises a settling disc base and a turntable body, wherein the turntable body is connected to a settling disc body through a fixed shaft; a temperature control assembly is arranged at a bottom of the settling disc base, and a glass slide inlet, a glass slide outlet and a cleaning and sample addition inlet are sequentially formed in a side wall of the settling disc base; at least one or more settling cup receiving grooves are uniformly arranged along a circumferential edge of the turntable body to receive one or more different settling cups; the turntable body rotates intermittently around the fixed shaft, at least four glass slide clamping slots are formed between the turntable body and the settling disc base, and glass slides without samples or glass slides with the samples are adaptively placed in the at least four glass slide clamping slots;
   a glass slide addition mechanism, wherein the glass slide addition mechanism is arranged adjacent to a glass slide inlet position of the rotary settling disc, and the glass slide addition mechanism is configured to push the glass slides without the samples into the rotary settling disc from the glass slide inlet position;
   a cleaning and sample addition integrated device, wherein the cleaning and sample addition integrated device is arranged on a side of the rotary settling disc, the cleaning and sample addition integrated device comprises a cleaning fluid assembly and a sample addition assembly, and the cleaning fluid assembly and the sample addition assembly add fluid to the one or more different settling cups simultaneously as the turntable body rotates intermittently; and
   a glass slide discharging mechanism, wherein the glass slide discharging mechanism is arranged adjacent to a glass slide outlet position of the rotary settling disc, and the glass slide discharging mechanism is configured to remove the glass slides with the samples from the glass slide outlet position.

2. The integrated constant-temperature fully-automatic cell smear preparation device according to claim 1, wherein an outer wall and a bottom of the settling disc base are provided with a thermal insulation layer, wherein an inner layer of the thermal insulation layer is provided with thermal insulation cotton, and an outer layer of the thermal insulation layer is provided with a metal cladding, wherein the inner layer of the thermal insulation layer is adjacent to the turntable body, and the outer layer of the thermal insulation layer is far away from the turntable body.

3. The integrated constant-temperature fully-automatic cell smear preparation device according to claim 1, wherein the temperature control assembly comprises a temperature control element and a heating device connected to the temperature control element, wherein the heating device is arranged at a position of the settling disc base, wherein the position of the settling disc base corresponds to the at least one or more settling cup receiving grooves, and the temperature control element comprises a resistance regulator.

4. The integrated constant-temperature fully-automatic cell smear preparation device according to claim 1, wherein the temperature control assembly controls a temperature of the one or more different settling cups in the at least one or more settling cup receiving grooves to be 20-60° C.

5. The integrated constant-temperature fully-automatic cell smear preparation device according to claim 1, wherein the glass slide addition mechanism comprises a glass slide case with an opening and a pushing device, wherein the pushing device pushes glass slides stored in the glass slide case to move to the glass slide inlet position via the opening, and then enter the at least four glass slide clamping slots of the rotary settling disc through the glass slide inlet.

6. The integrated constant-temperature fully-automatic cell smear preparation device according to claim 1, wherein the cleaning and sample addition integrated device further comprises a manipulator, wherein a first end of the manipulator is connected to a Z-direction adjustment mechanism, and the cleaning fluid assembly at a second end of the manipulator is connected to a fluid of the sample addition assembly; and
   the Z-direction adjustment mechanism reciprocates in a vertical direction to adjust a relative height of the manipulator relative to the turntable body.

7. The integrated constant-temperature fully-automatic cell smear preparation device according to claim 6, wherein the manipulator has an arc portion.

8. The integrated constant-temperature fully-automatic cell smear preparation device according to claim 1, wherein the glass slide discharging mechanism comprises a glass slide discharging fork and a drive mechanism connected to the glass slide discharging fork.

9. The integrated constant-temperature fully-automatic cell smear preparation device according to claim 1, wherein the at least one or more settling cup receiving grooves and the at least four glass slide clamping slots are arranged at intervals, and when the turntable body rotates intermittently, the glass slide inlet, the glass slide outlet and a glass slide clamping slot at a cleaning and sample addition inlet position are communicated with a space of the at least one or more settling cup receiving grooves.

10. A method for using the integrated constant-temperature fully-automatic cell smear preparation device according to claim 1, comprising the following steps:

step S1: allowing the glass slides without the samples to enter the rotary settling disc from the glass slide inlet and rotate intermittently with the turntable body; and step S2: allowing the cleaning fluid assembly and the sample addition assembly in the cleaning and sample addition integrated device to simultaneously add fluid to the one or more different settling cups as the turntable body rotates intermittently, at this time, adding, by the sample addition assembly, the samples to the glass slides without the samples through the one or more different settling cups, cleaning, by the cleaning fluid assembly, a settling cup that already completes sample addition, and removing the glass slides with the samples from the glass slide outlet.

11. The method according to claim 10, wherein in the integrated constant-temperature fully-automatic cell smear preparation device, an outer wall and a bottom of the settling disc base are provided with a thermal insulation layer, wherein an inner layer of the thermal insulation layer is provided with thermal insulation cotton, and an outer layer of the thermal insulation layer is provided with a metal cladding, wherein the inner layer of the thermal insulation layer is adjacent to the turntable body, and the outer layer of the thermal insulation layer is far away from the turntable body.

12. The method according to claim 10, wherein in the integrated constant-temperature fully-automatic cell smear preparation device, the temperature control assembly comprises a temperature control element and a heating device connected to the temperature control element, wherein the heating device is arranged at a position of the settling disc base, wherein the position of the settling disc base corresponds to the at least one or more settling cup receiving grooves, and the temperature control element comprises a resistance regulator.

13. The method according to claim 10, wherein in the integrated constant-temperature fully-automatic cell smear preparation device, the temperature control assembly controls a temperature of the one or more different settling cups in the at least one or more settling cup receiving grooves to be 20-60° C.

14. The method according to claim 10, wherein in the integrated constant-temperature fully-automatic cell smear preparation device, the glass slide addition mechanism comprises a glass slide case with an opening and a pushing device, wherein the pushing device pushes glass slides stored in the glass slide case to move to the glass slide inlet position via the opening, and then enter the at least four glass slide clamping slots of the rotary settling disc through the glass slide inlet.

15. The method according to claim 10, wherein in the integrated constant-temperature fully-automatic cell smear preparation device, the cleaning and sample addition integrated device further comprises a manipulator, wherein a first end of the manipulator is connected to a Z-direction adjustment mechanism, and the cleaning fluid assembly at a second end of the manipulator is connected to a fluid of the sample addition assembly; and the Z-direction adjustment mechanism reciprocates in a vertical direction to adjust a relative height of the manipulator relative to the turntable body.

16. The method according to claim 15, wherein in the integrated constant-temperature fully-automatic cell smear preparation device, the manipulator has an arc portion.

17. The method according to claim 10, wherein in the integrated constant-temperature fully-automatic cell smear preparation device, the glass slide discharging mechanism comprises a glass slide discharging fork and a drive mechanism connected to the glass slide discharging fork.

18. The method according to claim 10, wherein in the integrated constant-temperature fully-automatic cell smear preparation device, the at least one or more settling cup receiving grooves and the at least four glass slide clamping slots are arranged at intervals, and when the turntable body rotates intermittently, the glass slide inlet, the glass slide outlet and a glass slide clamping slot at a cleaning and sample addition inlet position are communicated with a space of the at least one or more settling cup receiving grooves.

* * * * *